United States Patent
Meyerhofer (10) Patent No.: US 8,253,970 B2
(45) Date of Patent: *Aug. 28, 2012

(54) METHOD AND APPARATUS FOR GAMING PROMOTIONAL PRINTER

(75) Inventor: Mark Meyerhofer, La Canada, CA (US)

(73) Assignee: FutureLogic, Inc., Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/892,626

(22) Filed: Sep. 28, 2010

(65) Prior Publication Data

US 2011/0099056 A1    Apr. 28, 2011

Related U.S. Application Data

(63) Continuation of application No. 10/952,299, filed on Sep. 27, 2004, now Pat. No. 7,812,992, which is a continuation-in-part of application No. 10/405,112, filed on Mar. 31, 2003, now Pat. No. 7,594,855.

(60) Provisional application No. 60/369,097, filed on Mar. 29, 2002.

(51) Int. Cl.
  *G06F 3/12* (2006.01)
  *A63F 9/24* (2006.01)
(52) U.S. Cl. ............................. 358/1.18; 463/1
(58) Field of Classification Search ............ 358/1.1, 358/1.13, 1.14, 1.15–1.18; 463/1, 16, 25, 463/29, 36, 39–43; 705/14; 710/11, 17; 235/375, 381
See application file for complete search history.

(56) References Cited

U.S. PATENT DOCUMENTS

| 4,602,279 | A | 7/1986 | Freeman |
| 4,723,212 | A | 2/1988 | Mindrum et al. |
| 4,910,672 | A | 3/1990 | Off et al. |

(Continued)

FOREIGN PATENT DOCUMENTS

| EP | 0173835 A2 | 3/1986 |
| JP | 11253609 | 9/1999 |

OTHER PUBLICATIONS

Futurelogic, Inc., "Heavy Duty Dollar Bill Size Direct Thermal Kiosk Printer User's Manual", Copyright 2000.

(Continued)

*Primary Examiner* — Gabriel Garcia
(74) *Attorney, Agent, or Firm* — Frank L. Cire (57) ABSTRACT

A method and apparatus for a promotional printer for use within a cashless enabled gaming machine or vending machine are disclosed. A promotional printer includes a coupon database describing a stack of coupons that are specified using a template based couponing printer language. A coupon is selected for creation and issued to a user or player based on a matrix of event-based triggers involving factors or parameters known to the promotional printer directly or supplied by a master promotional controller. Triggers may include the time of day, the date or amount of a cash-out voucher to be issued to the user or player, the duration of play on a gaming machine, a player classification, the amount of money or credits added to a game, or a random frequency of coupon issuance having satisfied any or all of the aforementioned factors. The promotional printer may further include the ability to store all of the coupons, trigger conditions, and related information resident in the promotional printer in a non-volatile fashion thus enabling a host system to download a promotional environment into the promotional printer which will run promotional campaigns on behalf of the hosting system.

20 Claims, 11 Drawing Sheets

U.S. PATENT DOCUMENTS

| | | | |
|---|---|---|---|
| 5,075,874 | A | 12/1991 | Steeves et al. |
| 5,174,056 | A | 12/1992 | King |
| 5,256,863 | A | 10/1993 | Ferguson et al. |
| 5,503,483 | A | 4/1996 | Petteruti |
| 5,551,692 | A * | 9/1996 | Pettit et al. ............... 463/16 |
| 5,568,612 | A | 10/1996 | Barrett |
| 5,594,920 | A | 1/1997 | Ebina |
| 5,612,868 | A | 3/1997 | Off et al. |
| 5,620,079 | A | 4/1997 | Molbak |
| 5,699,493 | A | 12/1997 | Davidson et al. |
| 5,710,887 | A | 1/1998 | Chelliah |
| 5,791,790 | A | 8/1998 | Bender |
| 5,816,918 | A | 10/1998 | Kelly et al. |
| 5,848,396 | A | 12/1998 | Gerace |
| 5,908,354 | A | 6/1999 | Okuniewicz |
| 5,909,673 | A | 6/1999 | Gregory |
| 5,916,024 | A * | 6/1999 | Von Kohorn ............... 463/40 |
| 5,943,241 | A | 8/1999 | Nichols et al. |
| 5,982,997 | A | 11/1999 | Stone et al. |
| 5,991,735 | A | 11/1999 | Gerace |
| 6,015,344 | A | 1/2000 | Kelly |
| 6,046,817 | A | 4/2000 | Brown |
| 6,048,269 | A | 4/2000 | Burns et al. |
| 6,094,644 | A | 7/2000 | Hillson |
| 6,113,098 | A | 9/2000 | Adams |
| 6,118,860 | A | 9/2000 | Hillson |
| 6,141,684 | A | 10/2000 | McDonald |
| 6,146,276 | A | 11/2000 | Okuniewicz |
| 6,243,450 | B1 | 6/2001 | Jansen |
| 6,324,528 | B1 | 11/2001 | Hillson et al. |
| 6,327,044 | B1 | 12/2001 | Shima |
| 6,394,907 | B1 | 5/2002 | Rowe |
| 6,415,341 | B1 | 7/2002 | Fry, Sr. et al. |
| 6,493,104 | B1 | 12/2002 | Cromer et al. |
| 6,511,377 | B1 | 1/2003 | Weiss |
| 6,575,090 | B1 | 6/2003 | Vienneau et al. |
| 6,612,984 | B1 | 9/2003 | Kerr, II |
| 6,620,046 | B2 | 9/2003 | Rowe |
| 6,647,437 | B2 | 11/2003 | Ackerman et al. |
| 6,840,860 | B1 | 1/2005 | Okuniewicz |
| 6,862,575 | B1 | 3/2005 | Anttila et al. |
| 6,892,182 | B1 | 5/2005 | Rowe |
| 6,896,618 | B2 | 5/2005 | Benoy et al. |
| 6,923,721 | B2 | 8/2005 | Luciano et al. |
| 6,924,903 | B2 | 8/2005 | Brooks et al. |
| 6,990,392 | B1 | 1/2006 | Meister et al. |
| 7,008,320 | B2 | 3/2006 | Rowe et al. |
| 7,128,650 | B2 | 10/2006 | Saffari |
| 7,134,962 | B2 | 11/2006 | Meyerhofer et al. |
| 7,156,738 | B2 | 1/2007 | Rowe |
| 7,666,078 | B2 | 2/2010 | Meyerhofer |
| 7,785,193 | B2 | 8/2010 | Paulsen |
| 7,871,325 | B2 | 1/2011 | Okuniewicz |
| 7,922,577 | B2 | 4/2011 | Okuniewicz |
| 2002/0034977 | A1 | 3/2002 | Burns et al. |
| 2002/0077901 | A1 | 6/2002 | Katz et al. |
| 2002/0107065 | A1 | 8/2002 | Rowe |
| 2002/0111210 | A1 | 8/2002 | Luciano et al. |
| 2002/0113124 | A1 | 8/2002 | Meyerhofer et al. |
| 2003/0013513 | A1 | 1/2003 | Rowe |
| 2003/0013527 | A1 | 1/2003 | Rowe et al. |
| 2003/0148812 | A1 | 8/2003 | Paulsen et al. |
| 2003/0186739 | A1 | 10/2003 | Paulsen et al. |
| 2004/0053681 | A1 | 3/2004 | Jordan et al. |
| 2005/0165637 | A1 | 7/2005 | Meyerhofer |
| 2010/0030635 | A1 | 2/2010 | Meyerhofer |

OTHER PUBLICATIONS

Futurelogic, Inc., "Operators and Technicians Manual", Copyright 2003.

"EZ-Load Thermal Printer Owner's Manual", Copyright 2003, Nanoptix, Inc.

"Paycheck PrinterTM, Technicians Manual", Copyright 2003, Nanoptix, Inc.

Office action regarding U.S. Appl. No. 12/562,046, Nov. 7, 2011.

"Nanoptix, Inc.'s Responses to Futurelogic, Inc.'S First Set of Interrogatories", submitted in Case No. 2:10-CV-7678-JFW(DTB).

Draft of "Nanoptix, Inc.'s First Amended Answer and Counterclaims", from Case No. 2:10-CV-7678-JFW(DTB).

Exhibit 10 of "Nanoptix, Inc.'s First Amended Answer and Counterclaims", from Case No. 2:10-CV-7678-JFW(DTB).

Exhibit 11 of "Nanoptix, Inc.'s First Amended Answer and Counterclaims", from Case No. 2:10-CV-7678-JFW(DTB).

Exhibit 12 of "Nanoptix, Inc.'s First Amended Answer and Counterclaims", from Case No. 2:10-CV-7678-JFW(DTB).

Exhibit 14 of "Nanoptix, Inc.'s First Amended Answer and Counterclaims", from Case No. 2:10-CV-7678-JFW(DTB).

Exhibit 15 of "Nanoptix, Inc.'s First Amended Answer and Counterclaims", from Case No. 2:10-CV-7678-JFW(DTB).

Exhibit 16 of "Nanoptix, Inc.'s First Amended Answer and Counterclaims", from Case No. 2:10-CV-7678-JFW(DTB).

Exhibit 17 of "Nanoptix, Inc.'s First Amended Answer and Counterclaims", from Case No. 2:10-CV-7678-JFW(DTB).

Exhibit 18 of "Nanoptix, Inc.'s First Amended Answer and Counterclaims", from Case No. 2:10-CV-7678-JFW(DTB).

Exhibit 19 of "Nanoptix, Inc.'s First Amended Answer and Counterclaims", from Case No. 2:10-CV-7678-JFW{DTB).

Exhibit 20 of "Nanoptix, Inc.'s First Amended Answer and Counterclaims", from Case No. 2:10-CV-7678-JFW{DTB).

"Confidential Deposition: M. Meyerhofer-vol. 1", from Case No. 2:10-CV-7678-JFW(DTB).

"Meyerhofer, Mark (vol. 01) (New) Jul. 27, 2011", partial deposition from Case No. 2:10-CV-7678-JFW(DTB).

"Confidential Depo: M. Meyerhofer-vol. 2", from Case No. 2:10-CV-7678-JFW(DTB).

Email, FL0023326, from Case No. 2:10-CV-7678-JFW(DTB).

Email, FL0020624, from Case No. 2:10-CV-7678-JFW(DTB).

Email, FL0002923, from Case No. 2:10-CV-7678-JFW(DTB).

Agenda, 11859B_MEYERHOFER_07_27_11_129, from Case No. 2:10-CV-7678-JFW(DTB).

Email, 11859B_MEYERHOFER_07_27_11_123, from Case No. 2:10-CV-7678-JFW(DTB).

Email, 11859B_MEYERHOFER_07_27_11_122, from Case No. 2:10-CV-7678-JFW(DTB).

Email, 11859B_MEYERHOFER_07_27_11_121, from Case No. 2:10-CV-7678-JFW(DTB).

Email, 11859B_MEYERHOFER_07_27_11_118, from Case No. 2:10-CV-7678-JFW(DTB).

Letter, 11859B_MEYERHOFER_07_27_11_117, from Case No. 2:10-CV-7678-JFW(DTB).

Functional Product Specification, 11859B_MEYERHOFER_07_27_11_114, from Case No. 2:10-CV-7678-JFW(DTB).

"First Expert Report of Kendyl A. Roman" from Case No. 2:10-CV-7678-JFW(DTB).

Exhibit 6A Summary of Certain Prior Patents Regarding Independent Claims from "First Expert Report of Kendyl A. Roman" from Case No. 2:10-CV-7678-JFW(DTB).

Exhibits 6b to 6T Invalidity Charts, from "First Expert Report of Kendyl A. Roman" from Case No. 2:10-CV-7678-JFW(DTB).

Exhibit 4, Image Writer pictures, from "First Expert Report of Kendyl A. Roman" from Case No. 2:10-CV-7678-JFW(DTB).

Exhibit 8, File History Excerpts, from "First Expert Report of Kendyl A. Roman" from Case No. 2:10-CV-7678-JFW(DTB).

* cited by examiner

METHOD AND APPARATUS FOR GAMING PROMOTIONAL PRINTER

CROSS-REFERENCE TO RELATED APPLICATIONS APPLICATION

This application is a continuation of U.S. application Ser. No. 10/952,299, filed Sep. 27, 2004, which is a continuation-in-part of U.S. application Ser. No. 10/405,112, now U.S. Pat. No. 7,594,855, filed Mar. 31, 2003, which claims the benefit of U.S. Provisional Patent Application No. 60/369,097, filed Mar. 29, 2002, the contents of each of which are hereby incorporated by reference as if fully stated herein.

BACKGROUND OF THE INVENTION

This invention relates generally to gaming and vending printers and more specifically to gaming and vending printers performing promotional coupon printing.

The gaming machine manufacturing industry provides a variety of gaming machines for the amusement of gambling players. An exemplary gaming machine is a slot machine. A slot machine is an electro-mechanical game wherein chance or the skill of a player determines the outcome of the game. Slot machines are usually found in casinos or other more informal gaming establishments.

Gaming machine manufacturers have more recently introduced cashless enabled gaming machines to the market and these have begun to find wide acceptance in the gaming industry. Cashless enabled gaming machines are so named because they can conduct financial exchanges using a mixture of traditional currencies and vouchers. Typically, a cashless enabled gaming machine has a gaming printer to produce vouchers and a bill acceptor that supports automatic reading of vouchers. To coordinate the activities of multiple cashless enabled gaming machines, one or more cashless enabled gaming machines may be electronically coupled to a cashless enabled gaming machine system that controls the cashless operations of a cashless enabled gaming machine.

When a player cashes out using a cashless enabled gaming machine coupled to a cashless enabled gaming machine system, the cashless enabled gaming machine signals the system and the system may determine the type of pay out presented to the player. Depending on the size of the pay out, the cashless enabled gaming machine system may cause the cashless enabled gaming machine to present coins in the traditional method of a slot machine, or the cashless enabled gaming machine system may cause a gaming printer in the cashless enabled gaming machine to produce a voucher for the value of the pay out. The voucher may then be redeemed in a variety of ways. For example, the voucher may be redeemed for cash at a cashier's cage or used with another cashless enabled gaming machine. In order to use the voucher in a cashless enabled gaming machine, the voucher is inserted into a bill acceptor of another cashless enabled gaming machine at a participating casino and the cashless enabled gaming machine system recognizes the voucher, redeems the voucher, and places an appropriate amount of playing credits on the cashless enabled gaming machine.

Cashless enabled gaming machines have found an increasing acceptance and use in the gaming industry with players who enjoy the speed of play and ease of transporting their winnings around the casino and the casinos who have realized significant labor savings in the form of reduced coin hopper reloads in the games, and an increase in revenue because of the speed of play. This increasing acceptance practically guarantees a wide installed base of networked games with captive player audiences for issuance of coupons and promotional tickets using generally the same equipment already installed within a cashless enabled gaming machine system for the purpose of supporting cashless gaming vouchers. In addition, vending machine manufacturers have increasingly added additional printing features to their vending machines.

SUMMARY OF THE INVENTION

In one aspect of the invention, a promotional printer for use within a cashless enabled gaming machine or vending machine controls printing of coupons. the promotional printer includes a coupon database describing a stack of coupons that are specified using a template based couponing printer language. A coupon is selected for creation and issued to a user or player based on a matrix of event-based triggers involving factors or parameters known to the promotional printer directly or supplied by a master promotional controller. Triggers may include the time of day, the date or amount of a cash-out voucher to be issued to the user or player, the duration of play on a gaming machine, a player classification, the amount of money or credits added to a game, or a random frequency of coupon issuance having satisfied any or all of the aforementioned factors. The promotional printer may further include the ability to store all of the coupons, trigger conditions, and related information resident in the promotional printer in a non-volatile fashion thus enabling a host system to download a promotional environment into the promotional printer which will run promotional campaigns on behalf of the hosting system.

In one aspect of the invention, a method of printing a promotional coupon in a gaming environment includes receiving coupon data by a promotional printer in a cashless enabled game from a promotional controller via a communications network. The coupon data includes a coupon description written in a template definition language. The promotional printer then generates the coupon using variable data and the coupon template in response to a trigger.

In another aspect of the invention, the variable data is received by the promotional printer from the promotional controller via the communications network. In this aspect, the promotional controller generates the trigger and transmits the trigger to the promotional printer via the communications network.

In another aspect of the invention, the coupon data includes trigger control parameters and the trigger is generated by the promotional printer using the trigger control parameters and trigger data. The trigger data may include a date, a time of day, a frequency of issuance of the coupon, or a time of play by a player of a gaming machine.

In another aspect of the invention, the promotional printer is further coupled to a gaming or vending machine controller and the trigger data is received by the promotional printer from the machine controller. The trigger data may include a player identifier, an amount of money in play on a gaming machine, a duration of a current session of play of a gaming machine, a cash-in of a player or a cash-out of a player.

In another aspect of the invention, coupon issuance data is stored by the promotional printer and the coupon issuance data is transmitted by the promotional printer to the promotional controller via the communications network.

In another aspect of the invention, a promotional controller transmits coupon data to a promotional printer via a communications network with the coupon data including a coupon template. The promotional controller transmits variable data and trigger data to the promotional printer via the communications network. In response to the transmission, the promotional printer generates a coupon using the coupon template and the variable data.

In another aspect of the invention, the promotional printer
In another aspect of the invention, the promotional printer stores coupon issuance data and the promotional controller receives the coupon issuance data by the promotional controller from the promotional printer via the communications network.

In another aspect of the invention, a promotional printer comprises a processor and a memory coupled to the processor. The memory has stored program instructions executable by the processor where the program instructions include receiving coupon data including a coupon template from a promotional controller via a communications network. The program instructions for the promotional printer also include instructions for generating a coupon using variable data and the coupon template in response to a trigger.

In another aspect of the invention, a promotional controller includes a processor and a memory coupled to the processor. Program instructions for implementing the features of a promotional controller are stored in the memory and are executable by the processor. The program instructions include: transmitting coupon data to a promotional printer via a communications network wherein the coupon data includes a coupon template; transmitting variable data to the promotional printer via the communications network; and transmitting trigger data to the promotional printer whereby the promotional printer generates a coupon using the coupon template and the variable data in response to the trigger data.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1:
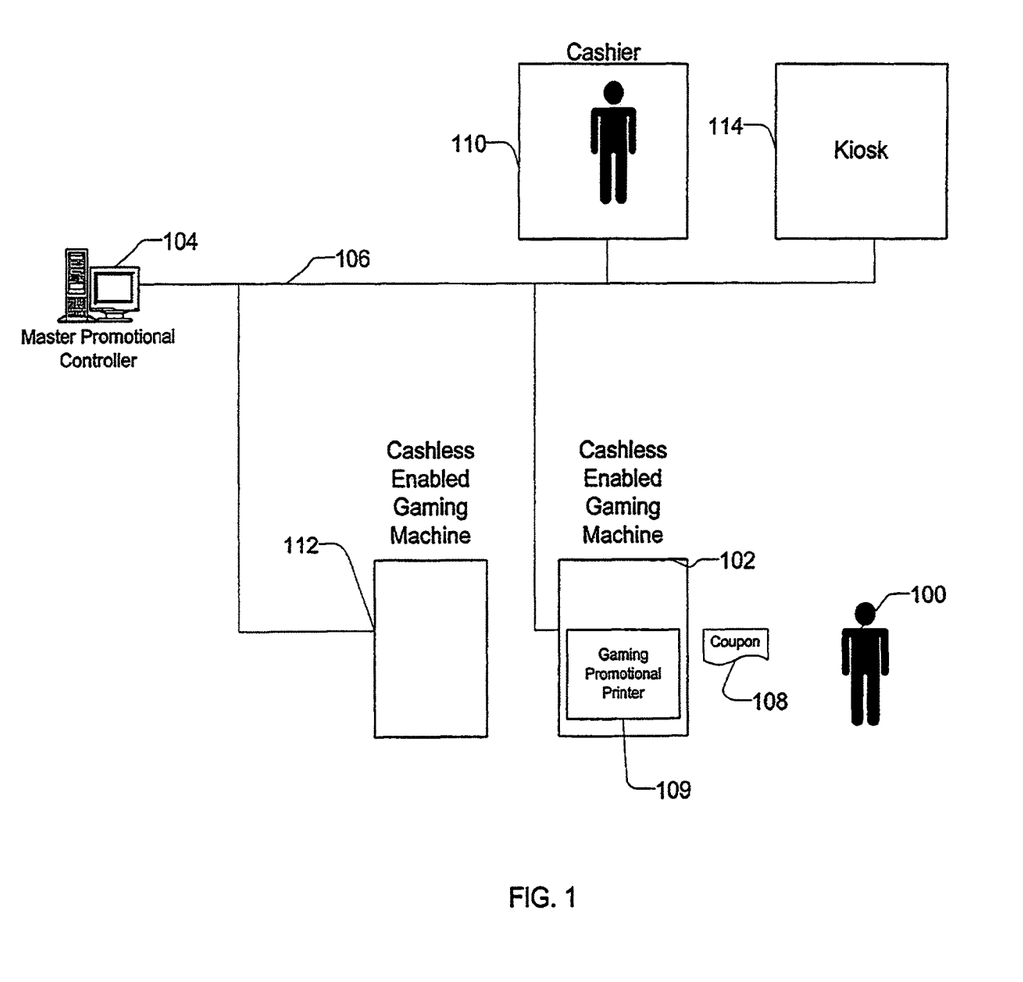
FIG. 1 is block diagram illustrating a gaming environment employing coupon issuance in accordance with an exemplary embodiment of the present invention.

FIG. 1 is block diagram illustrating a gaming environment employing couponing in accordance with an exemplary embodiment of the present invention. A player 100 uses a cashless enabled gaming machine 102 to play a gambling game or game of skill. As the player plays the game, a master promotional controller 104 coupled to one or more cashless enabled gaming machines through a communications network 106 triggers the generation of promotional coupons 108 for use by the player. The promotional coupons are generated by a promotional gaming printer 109 included in a cashless enabled gaming machine. The master promotional controller can either be a controller network connected to one or more promotional printers, a controller within a cashless enabled gaming machine or promotional printer, or an intelligent routing and management device for one or more promotional printers. In one embodiment of a master promotional controller, the master promotional controller directs the promotional activity of the promotional printers via direct promotional coupon requests. In another embodiment of a master promotional controller, the master promotional controller uses a cashless enabled gaming machine's promotional printer to store promotional coupon databases and triggers.

Once a promotional coupon has been issued by a promotional printer, the promotional coupon may be redeemed with a human operator or cashier 110, or redeemed automatically through a another redemption device, such as a bill acceptor in another cashless enabled gaming machine 112, or redeemed at a kiosk 114 which is not a game but provides some other form of automatic interface for a promotional coupon holder.

In one embodiment of a master promotional controller, the master promotional controller is coupled to the redemption devices. In another embodiment of an master promotional controller, a non-game kiosk or casino personnel may or may not interface back to the master promotional controller when redeeming a promotional coupon. Information relative to couponing activity is exchanged with the master promotional controller, the net result being the promotional printers fitting into the system as distributed intelligent sub-units, significantly off-loading the master promotional controller's real time servicing requirements and avoiding network bandwidth issues associated with live streaming of promotional coupons during a relatively short cash-out time window.

In one gaming environment employing couponing in accordance with an exemplary embodiment of the present invention, each promotional printer in the gaming environment has a unique address or identifier so that a population of promotional printers on the network can be addressed in whole or individually for promotional purposes.

Figure 2:
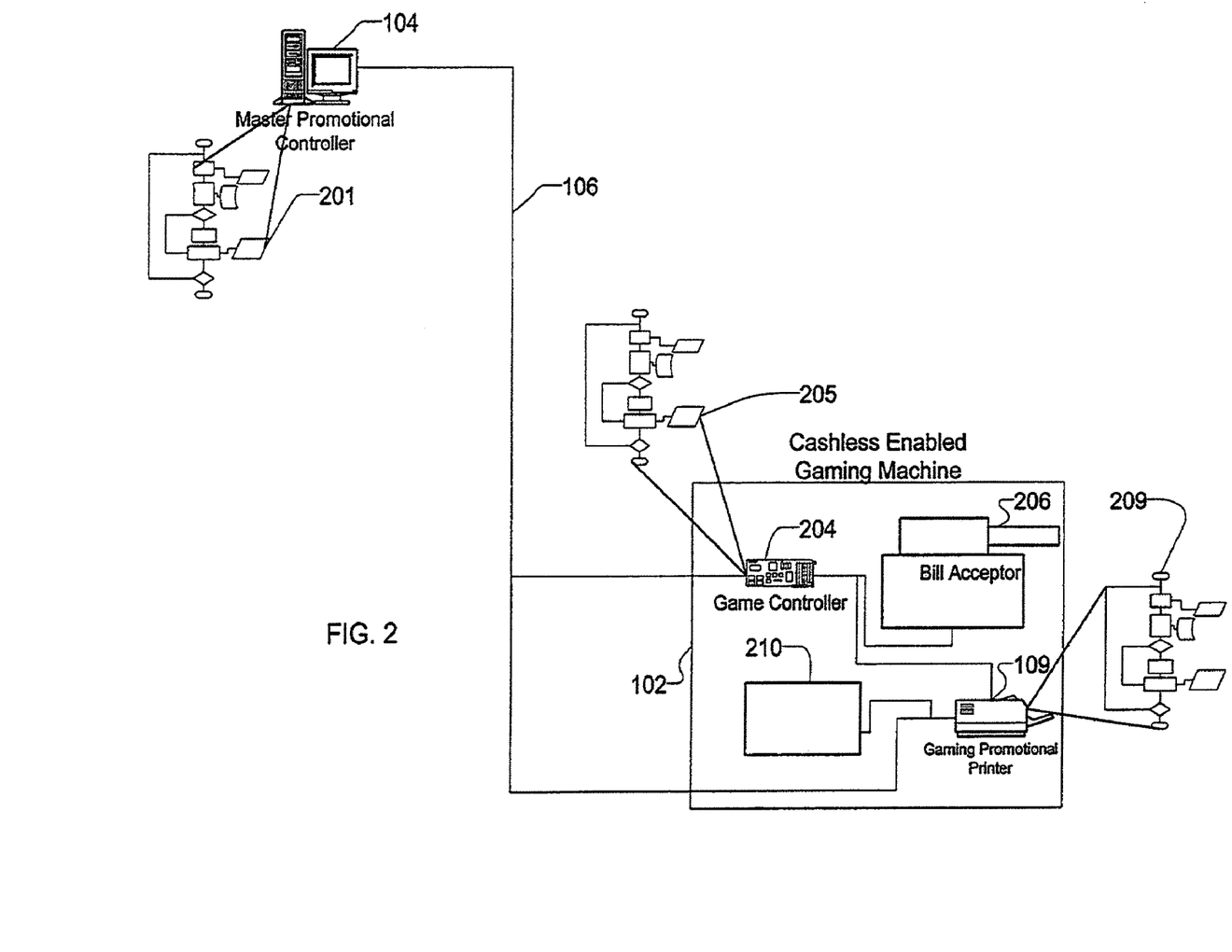
FIG. 2 is a deployment diagram of a coupon issuing system in accordance with an exemplary embodiment of the present invention.

FIG. 2 is a deployment diagram of a couponing system in accordance with an exemplary embodiment of the present invention. In a couponing system, a master promotional controller 104 is coupled to one or more cashless enabled gaming or vending machines, as illustrated by cashless enabled gaming machine 102, through a communications network 106 by coupling to a promotional printer 109 included in the cashless enabled gaming machine. The master promotional controller is programmable and includes master promotional controller programming instructions 201 controlling the master promotional controllers operations including communications with the promotional printer.

In one promotional printer in accordance with an exemplary embodiment of the present invention, a stand alone promotional printer includes all of the necessary processing capabilities, memory, and promotional printer programming instructions 209 needed to perform promotional couponing operations for the cashless enabled gaming or vending machine. In other embodiments of promotional printers, a promotional printer is created by coupling a promotional module 210 to a conventional gaming printer, enabling the gaming printer to function as a promotional printer. A standalone gaming or vending promotional printer or a promotional printer created from a conventional gaming or vending printer coupled to a promotional module are hereinafter termed either a "promotional printer" or a "promotional module."

The master promotional controller may be coupled to a vending or gaming machine controller 204 included in the cashless enabled gaming machine. By coupling to a machine controller, the master promotional controller may receive information from the machine controller about the gaming operations of the cashless enabled gaming or vending machine separately from the promotional printer printing operations.

The cashless enabled gaming or vending machine may also include a bill acceptor 206 coupled to the machine controller. A cashless enabled gaming or vending machine uses a bill acceptor for redemption of promotional coupons and acceptance of vouchers or cash.

In operation, the master promotional controller transmits packets of variable data or coupon data describing a promotional database to the promotional printer. The contents of the promotional database include descriptions of a plurality of promotional coupons, cash vouchers, advertisements or other enticements which are hereinafter collectively referred to as "coupons". The promotional printer receives the promotional database and stores the promotional database in the promotional printer's local memory.

The promotional printer also stores specifications of how to print the coupons in its local memory. The specifications of the coupons are stored as templates written in a template based printer language. This allows the coupons to be predefined, formatted, and stored in the promotional printer completely or partially for later recall.

Upon reception of a trigger data signal from either the master promotional controller or the machine controller, the promotional printer references and parses the promotional database and coupon templates to generate and issue promotional coupons or tickets printed on paper media. The paper media may be used specifically for the purpose of generating promotional coupons, or the paper media may be used for the purpose of printing pay out vouchers associated with cashless gaming.

Figure 10A:
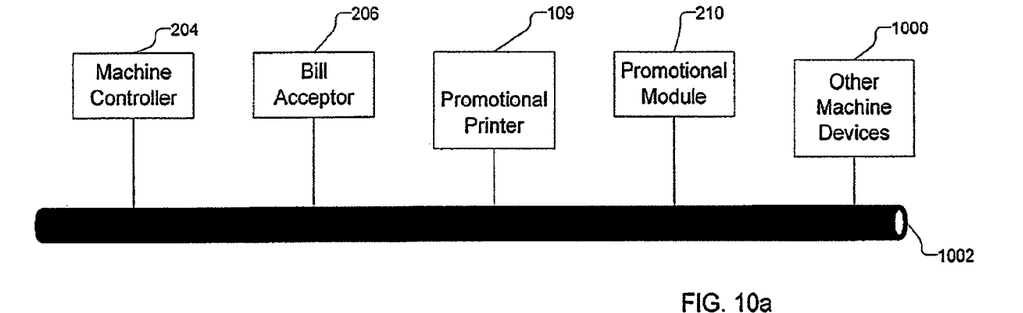
FIG. 10a is a block diagram of a gaming or vending machine incorporating a multidrop communications network in accordance with an exemplary embodiment of the present invention.

FIG. 10a is a block diagram of a gaming or vending machine incorporating a multidrop communications network in accordance with an exemplary embodiment of the present invention. A gaming or vending machine may employ a multidrop communications network 1002 to route communications between a machine controller 204 and various devices in the gaming or vending machine. In this embodiment of a gaming or vending machine, the machine controller communicates with a bill acceptor 206, a promotional printer 109, a promotional module 210, and other gaming or vending machine devices 1000 over the multidrop network. In such a network, each specific device or controller has a unique address. The specific device or controller listens to all the messages sent through the network by the various controllers and devices on the network but may only respond to messages that are addressed to that specific device. As such, the promotional module may passively "listen in" on gaming or vending machine operational signals, such as messages meant for the other devices, by receiving messages intended for the other devices and not responding to any message not intended for the promotional module. In this way, the promotional module can determine the state of the gaming or vending machine as the gaming or vending machine operates by examining communications between the disparate devices.

Figure 10B:
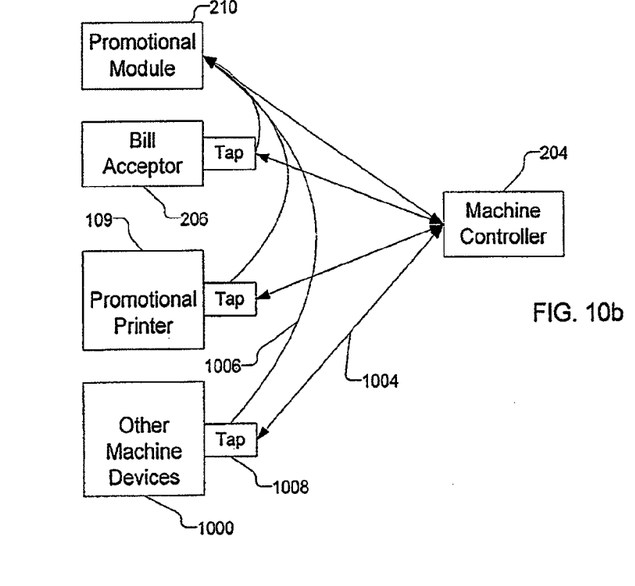
FIG. 10b is a block diagram of a gaming or vending machine incorporating a point-to-point communications system in accordance with an exemplary embodiment of the present invention.

FIG. 10b is a block diagram of a gaming or vending machine incorporating a point-to-point communications system in accordance with an exemplary embodiment of the present invention. In this embodiment of a gaming or vending machine, a machine controller 204 is coupled to the various devices, such as bill acceptor 206, promotional printer 109, and other such gaming or vending machine devices 1000, incorporated into the gaming or vending machine by one or more point-to-point communications links 1004. As each device has it's own communications link with the machine controller, a gaming promotional controller has no opportunity to listen in on a network communications. Instead, a promotional module 210 listens in on communications between the disparate devices by receiving one or more communications signals 1006 gleaned from one or more listening taps 1008 installed on the devices.

The taps may be passive devices that merely duplicate the signals being transmitted between the devices or controller. If the taps are passive devices, the promotional module discerns which communications are being sent by which devices. To do so, the promotional module may parse a message and determine from the contents of the message which device sent the message. The promotional module may also incorporate one or more communications ports with each port assigned to a specific device. The promotional module may then identify the specific device transmitting a message by simply knowing which communications port received the message.

The taps may also be active devices. In this case, a tap may add a header to any messages transmitted to or from a device to which the tap is coupled, thereby associating each message with a device identifier.

Figure 3:
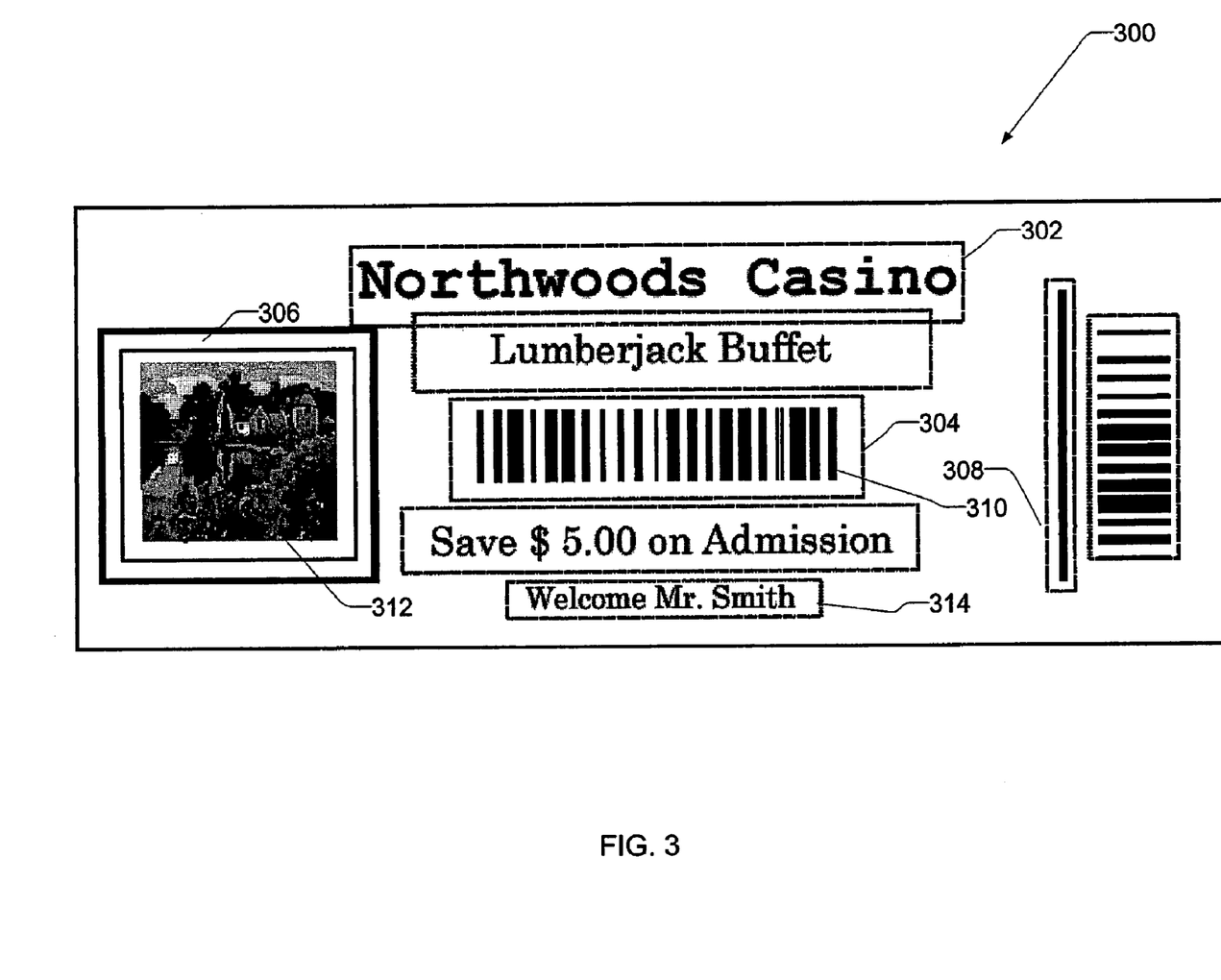
FIG. 3 is an illustration of a coupon including logical fields described in a template based printer language in accordance with an exemplary embodiment of the present invention.

FIG. 3 is an illustration of a coupon including logical fields described in a template based printer language in accordance with an exemplary embodiment of the present invention. In this example, a coupon may 300 include four types of data fields: text fields, such as text field 302; barcode fields, such as barcode field 304; graphic fields, such as graphic field 306; and line/box draw fields, such as line/box draw field 308. The fields of a coupon are described using coupon description data included in an electronic template that may be stored by a promotional printer. A template may include a plurality of fields in combination, resulting in a paste-up style printed coupon. A plurality of templates describing different types of coupons may be stored in a promotional printer supporting a rich couponing environment.

The actual value or data for each of the fields described in a coupon template may or may not be included in the template itself. For example, a template may include a barcode field for printing a barcode 310. However, the actual value of the barcode is transmitted to a promotional printer at the time a coupon is generated using the coupon template. In this way, a coupon may have fields that include static data, such as graphic 312 in a graphic field, or dynamic data, such as the name of a particular patron 314 in a text field. In this way, customized coupons may be printed by a promotional printer without transferring large amounts of data through a communications network coupling a promotional printer to a master promotional controller.

In addition, data that is used to track usage of coupons may be included in a coupon. For example, a barcode field or a text field may be used to print a barcode value or text string uniquely identifying a coupon. In this way, a gaming provisional printer creates an image of a barcode or barcodes, characters or marks that may be read by a cashless enabled gaming or vending machine bill acceptor on the same or another cashless enabled gaming or vending machine, allowing automatic acceptance of coupons into a cashless enabled gaming system in a casino or another related casino property.

A coupon template includes a plurality of command strings. Each command string conforms to the following syntax:
delimiter<cmd_Ltr>|<data_field1>|      .      .      .
|<data_fieldx>|delimete r;comment
where:
   delimiter=a delimiter character
   <cmd_ltr>=command identifier letter
   <data_fields1–x>=fields which include information relative to the command
   |=Pipe character. This serves as the delimiter between data fields in a command.
   ;=Semi-colon. This is a comment field designator.

A template defining a coupon adheres to following syntax:
delimiter<template_cmd_ltr>|<t_id>|<targ_mem>|<t_dim_da>|<t_dim_pa>|<pr#1>|<pr#2>| . . . |<pr#n>|delimiter
where:
   <t_id>=Template I.D.
   <targ_mem>=target memory storage.
   <t_dim_da>=Template dimension on a dotline axis in dots.
   <t_dim_pa>=Template dimension in dots in the paper axis.
   <pr#1> . . . <pr#n>=list of coupon database resident print regions ID's used in the format of this coupon.
   These fields are the method by which print regions used on a coupon are linked together and to the coupon template.

A print region is a print field used in a template to format print data. The print region command is used to define the basic types of print regions such as text, barcode, graphics, and a line/box draw.

A define print region command defines the particular font, barcode, graphic, or line style which is to be used, and provides special formatting information on how it is to be used. Multiple print regions may be defined and memorized in a promotional printer's coupon database.

A define print region command adheres to the follow syntax:
delimiter<print_region_cmd_ltr>|<r_id>|<targ_mem>|<da_start>|<pa_start>|<da_len>|<pa_len>|<rot>|<just>|<obj_id>|<mul_1>|<mul_2>|<obj_att>|<pr_att>|<pr_data>|delimter
where:
   <r_id>=print region identifier.
   <targ_mem>=target memory storage.
   <da_start>=dot axis start position in dots.
   <pa_start>=paper axis start position in dots.
   <da_len>=dot axis length of print region in dots.
   <pa_len>=paper axis length of print region in dots.
   <rot>=rotation of strings or data within print region.
   <just>=justification of data within print region.
   <obj_id>=print object identifier. Range 1 byte. This is the print object (barcode, font, line/box or graphic) used to format print the data from a print command.
   <mul_1>=Print object multiplier 1. For text, it is a font width multiplier. For barcodes, it indicates narrow bar width or modulo bar width. For a line, this represents thickness of the line in dots.
   <mul_2>=Print object multiplier 2. For text, this represents a font height multiplier. For a barcode, it indicates a wide bar width.
   <obj_att>=object printing attributes. This contains special instructions on how to treat the print objects within a print region
   <pr_att>=print region attributes. This contains special instructions on handling of the print region. A '0' indicates text will be sent in a print batch command. A '1' indicates use text which follows in pr_data field for a print region. A '2' indicates a print region will auto increment with each coupon in a batch. The base value is stored in a pr_data field. A '3' indicates an auto-decrement print region which will auto-decrement with each coupon in a batch. The base value is stored in a pr_data field.
   <pr_data>=permanently stored data which always appears in this print region. This field contains stored text if requested by entering a '2' in <pr_att> field.

A library command is used to manage defined graphics. A library command adheres to the following syntax:
delimiter<library_cmd_ltr>|<lib_funct>|<mem>|<obj_id>|<mem_req>|<ld_file size>|obj_data delimiter
where:
   <lib_funct>=operation to perform: 'A'—add object, enter download mode, 'D'—delete object.
   <mem>=target memory in which to place the object being downloaded.
   <obj_id>=object identification. This is the object I.D. byte.
   <mem_req>=memory usage specifier. For loading a graphic: size of a graphic file. The library command header is terminated after this field and obj_data is expected immediately following. For deleting graphics: 'G' is used in this field.
   <ld_file_size>=file size indicator.
   obj_data=object data (font or graphic) in appropriate format if <lib_funct>='A'. Format for graphics: PCX.

Figure 4:
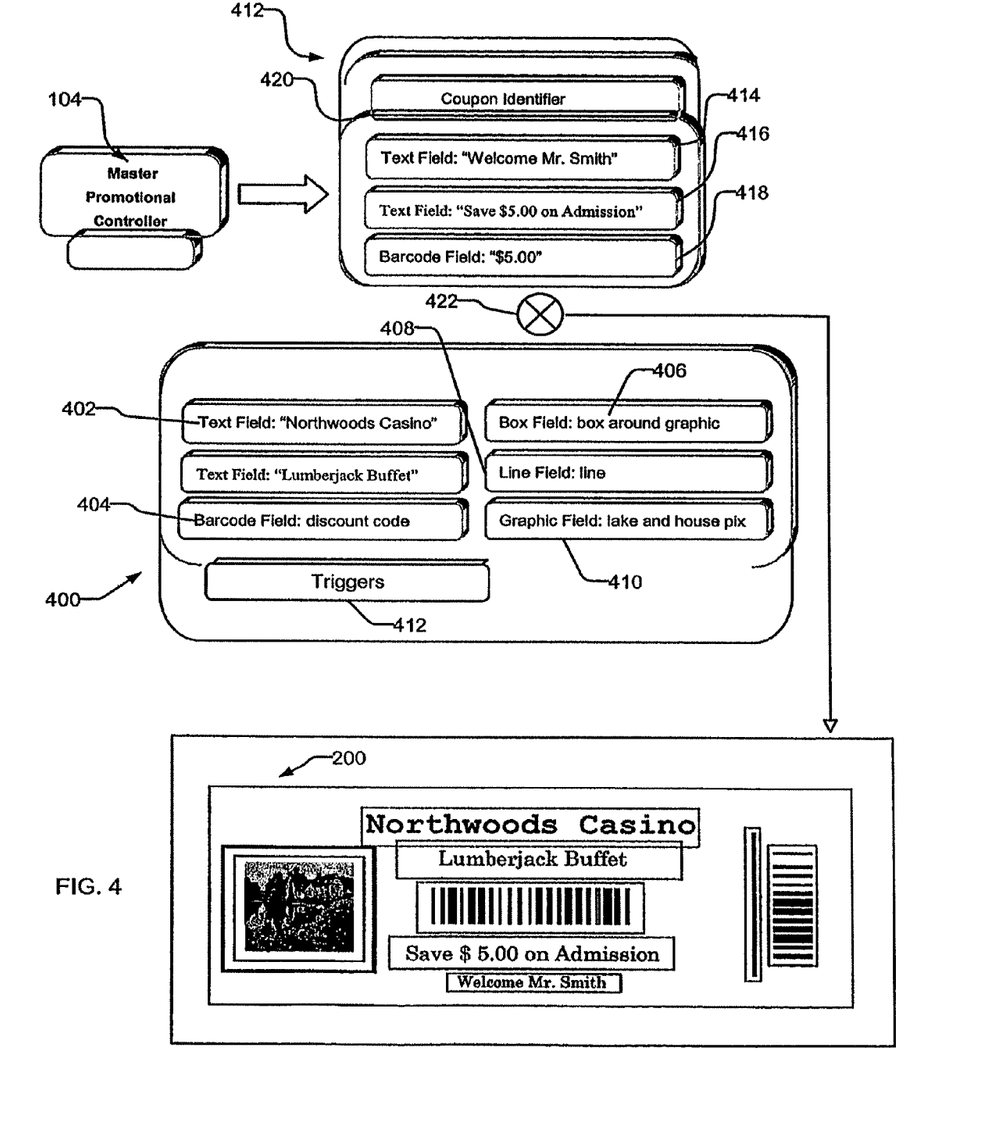
FIG. 4 is a block diagram of coupon template field elements stored partially resident in a promotional gaming printer and partially supplied by a master promotional controller at the time of print and issue in accordance with an exemplary embodiment of the present invention.

FIG. 4 is a block diagram of coupon template field element stored partially resident in a promotional gaming printer and partially supplied by a master promotional controller at the time of print and issue in accordance with an exemplary embodiment of the present invention. FIG. 4 illustrates how a master promotional controller selects a type of coupon and transmits particulars, such as variable data to be placed in fields in the coupon, for each print and issuance event. Values for the fields that make up a coupon 300 may be divided into two groups or sets. A resident variable data set 400 may be stored locally in a promotional printer. The resident set of variable data may include variable data such as: variable data for a text field containing an identifier of a casino 402; variable data for a barcode field identifying a type of promotion 404; a template description used to generate a graphic such as box variable data 406 or line variable data 408; or an identifier or actual variable data for a graphic 410. A dynamic variable data set include variable data for fields having variable data that are stored in the promotional printer and are saved in a template definition for a particular coupon. Examples of variable data in a dynamic variable data set include: text variable data for a player identifier 414; text variable data describing a promotion item 416; and barcode variable data 418 for quantifying a value of a promotion for printing on the coupon.

Both variable data sets may be transmitted from a master promotional controller 104 to a promotional printer in the form of communication packets. When a promotional printer receives a variable data set, the promotional printer stores the variable data set for future use. A resident variable data set includes variable data that may be reused for generating many coupons; therefore, a resident variable data set may be stored in the promotional printer for an extended period of time. In contrast, a dynamic variable data set may be used for a short period of time, perhaps for even a single generation of a single coupon. As such, the dynamic variable data set and static variable data set associated in a coupon may be transmitted to a promotional printer at different times. To retain association between the variable data sets, part of the communication packet issued by the master promotional controller may include a reference 420 to a template definition so that the dynamic data in the communication packet can be combined 422 with the static field data stored in a promotional printer to generate a complete coupon 200.

Since it is possible to store all fields used in a coupon within the promotional printer's memory, a master promotional controller may issue a complete coupon by simply sending a reference to a coupon so defined to generate a coupon in its entirety. It is also possible for a master promotional controller to offload the entire live communication burden by sending a complete coupon database including triggers during off-peak times.

In one embodiment of a promotional printer, a promotional printer is triggered to print coupons from the promotional printer's internal database under direct control of a master promotional controller that triggers the issuance of a coupon and conveys any pertinent variable information associated with the coupon such as promotion type, face value of the coupon, date of expiration and the like.

Figure 5:
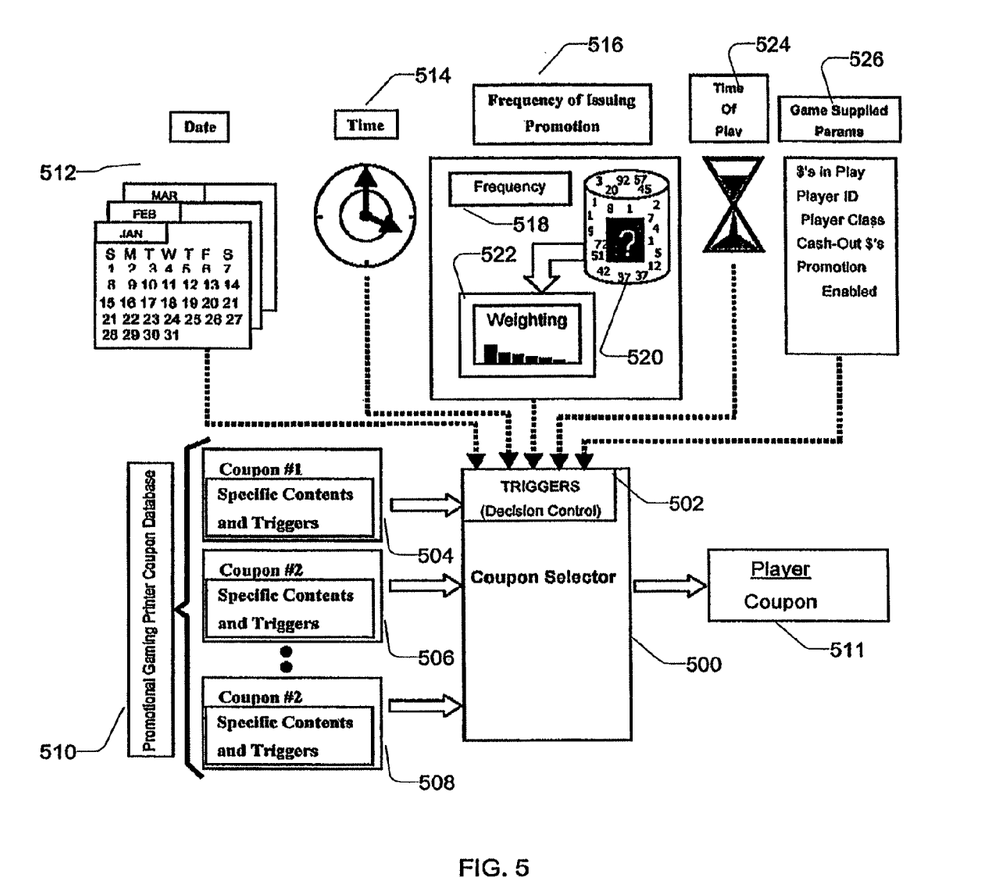
FIG. 5 is a block diagram of an exemplary coupon "stack" and logical trigger matrix resident in a promotional printer in accordance with an exemplary embodiment of the present invention.

FIG. 5 is a block diagram of an exemplary coupon stack and logical trigger matrix resident in a promotional printer in accordance with an exemplary embodiment of the present invention. As previously noted, a promotional printer may print a coupon in response to either internal or external event signals or trigger data. To respond to a trigger, a promotional printer includes a coupon selector logic module 500 that analyzes trigger data 502 as trigger data becomes available and determines which coupons should be printed in response to the trigger data. Coupons, such as coupons 504, 506, and 508, are stored in a coupon database 510 as a stack. The stack of coupons are a plurality of predefined coupons that can generate a coupon 511 anytime a set of trigger conditions to which a coupon is associated is satisfied. These trigger conditions can operate independently or in logical combination.

Exemplary logical trigger data utilized in a promotional printer for initiating generation of coupons includes: date 512, time of day 514, frequency of issuance of a particular coupon 516, time of play 524, and game issued parameters 526 to the printer such as player identification, amount of money in place, duration of the current session of play and the like. By utilizing the illustrated trigger matrix, it is possible for a promotional printer to issue coupons without any information provided by an master promotional controller at the time of a cash-out or cash-in by a player.

In one promotional printer in accordance with an exemplary embodiment of the invention, the promotional printer receives from a master promotional controller a coupon trigger database thereby enabling the promotional printer to self-manage its couponing activity. The coupon trigger database may include different types of trigger control parameters including: triggering a coupon generation anytime a cash out voucher is printed; generating a coupon whenever a voucher for greater than, equal to, or less than a specified amount of money is issued; generating a coupon based on an identity of a player; generating a coupon based on a category or classification of a player related to frequency of play or money volume; generating a coupon based on the duration of play of the gaming machine by a player; and generating a coupon anytime a player adds money or credits to a game in an amount greater than, equal to, or less than a specified amount.

In another aspect of the invention, a component of the promotional printer's internal database includes a set of control parameters that instruct the promotional printer to select the type, quantity, and frequency of coupons to create and issue related to any of the triggers listed above. These control parameters may operate separately or in combination with each coupon in the database. Parameters that may be used include: a total quantity of a coupon being issued before the coupon is retired from the coupon database; a frequency 518 of issuance of a coupon based on the number of occurrences of specified trigger events; a frequency of issuance of a coupon based on random odds 520, such as one in one hundred trigger events; a backup coupon or coupons should a particular coupon fail to print for lack of satisfying its specified set of qualifiers; whether or not the coupon is issued based on the time the trigger occurred; and whether the coupon is issued based on the date the trigger occurred.

In one embodiment of promotional printer, a real time clock electronic device is included within the promotional printer for the purposes of supporting time dependent promotional activity as described above.

Figure 6:
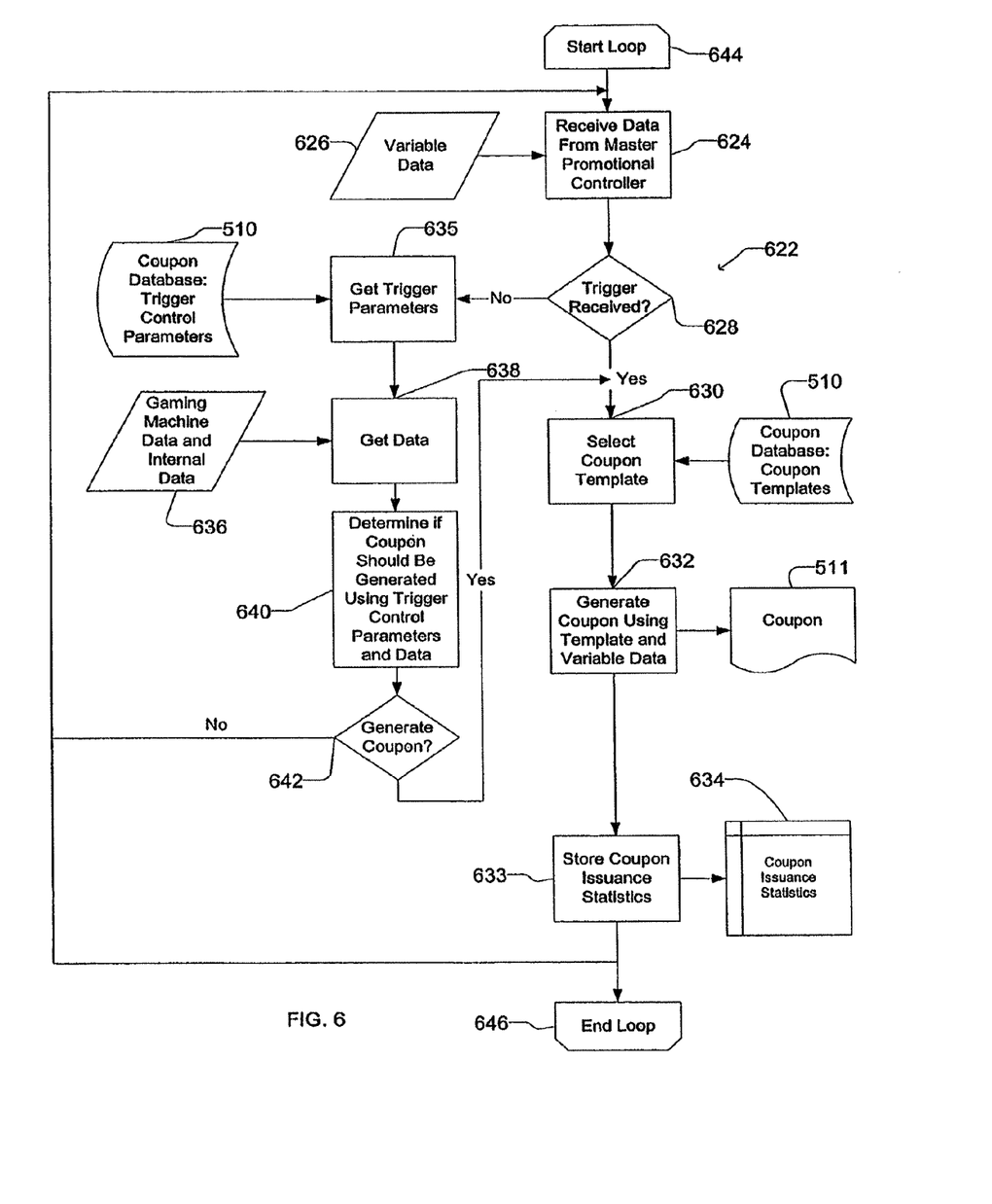
FIG. 6 is a process flow diagram of a coupon generation process in accordance with an exemplary embodiment of the present invention.

FIG. 6 is a process flow diagram of a trigger matrix process in accordance with an exemplary embodiment of the present invention. A trigger matrix process 622 is used by a promotional printer to determine if a coupon should be generated and issued to a player. The trigger matrix process receives (624) variable data from a master promotional controller. The trigger matrix process determines (628) if the variable data includes a coupon trigger instructing the promotional printer to issue a coupon. If so, the trigger matrix process selects (630) an appropriate coupon to issue from a coupon database 510. The trigger matrix process then generates (632) a coupon 511 using the selected coupon template. In addition, the trigger matrix process may use a portion of the variable data received from the master promotional controller to customize the coupon when the coupon is generated. The trigger matrix process may then store (633) coupon issuance statistical data (634) for later retrieval by the master promotional controller.

A trigger matrix process may also initiate issuance of a coupon even if the master promotional controller does not transmit a trigger to the promotional printer. To do so, the matrix trigger process gets (635) trigger control parameters stored in the promotional coupon database 510 that correspond to stored coupon templates in the promotional coupon database. The trigger matrix process then gets (638) gaming or vending machine and other internal data 636 and determines (640) if a coupon should be issued using the data and trigger control parameters. If the trigger matrix process determines (642) that a coupon should be generated, the trigger matrix process issues a coupon as previously described, this time selecting a coupon template using the trigger control parameters.

The promotional printer is a real-time device meaning that it continuously processes incoming trigger data and triggers. As such, the trigger matrix process may be configured as an endless loop as indicated by the start loop 644 and stop loop 646 symbols.

Figure 7:
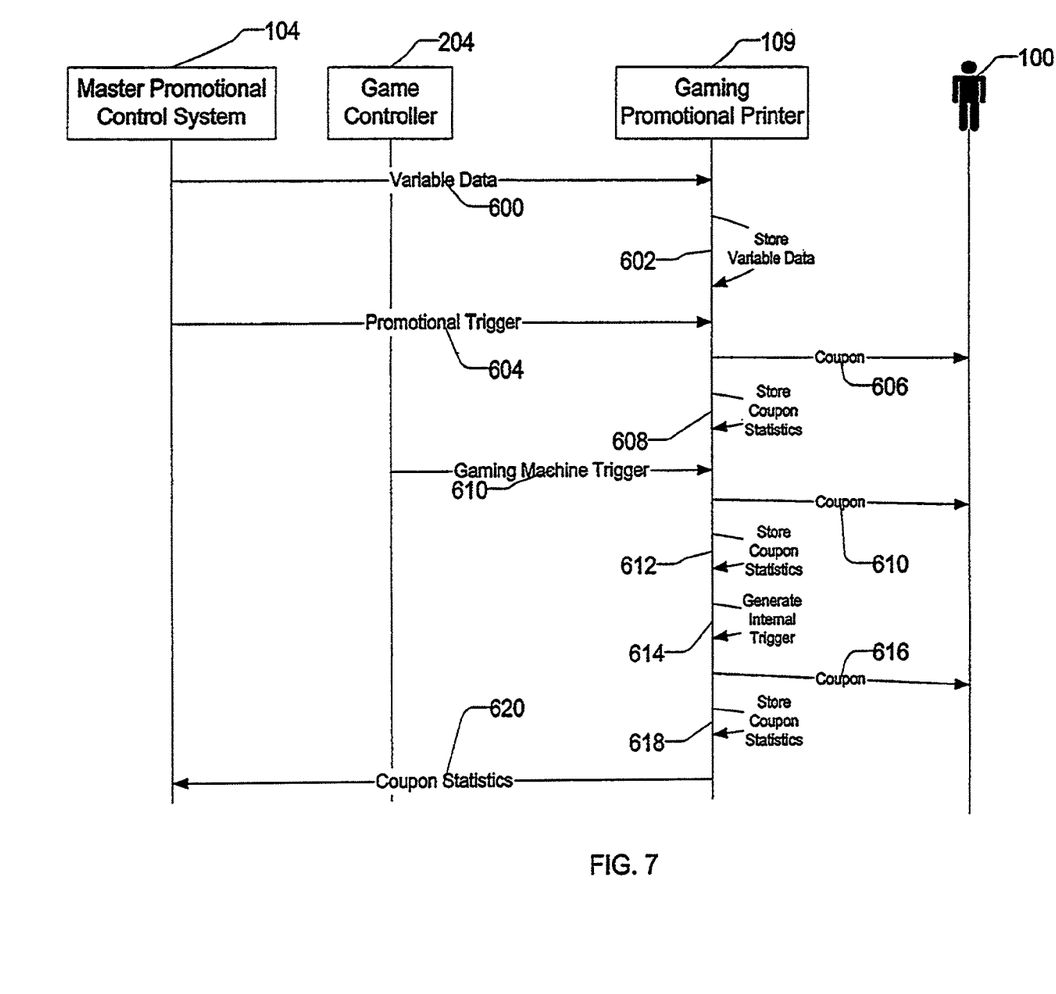
FIG. 7 is a sequence diagram of a coupon generating process in accordance with an exemplary embodiment of the present invention.

FIG. 7 is a sequence diagram of a coupon generating process in accordance with an exemplary embodiment of the present invention. A master promotional controller 104 transmits coupon or variable data 600 to a promotional printer 109. The promotional printer stores (602) the coupon data for later use by the promotional printer in printing a coupon. As previously described, the coupon data may include coupon templates, sets of dynamic and static variable data, trigger control parameters, and entire promotional coupon databases.

A promotional printer may receive various triggers that initiate generation of a coupon for a player 100. The master promotional controller may transmit a promotional trigger (604) to the promotional printer. In response to the promotional trigger, the promotional printer generates a coupon 606 for use by the player. The promotional printer then stores (608) statistical data about the just generated coupon. The promotional printer may also receive a gaming or vending machine trigger 610 from a machine controller 204 in a cashless enabled gaming or vending machine. In response to the gaming or vending machine trigger, the promotional printer generates a coupon 610 for use by the player. The promotional printer then stores (612) statistical data about the just generated coupon. The promotional printer may also generate (614) an internal trigger on its own such that the promotional printer generates a coupon 616 for use by the player. The promotional printer then stores (618) statistical data about the just generated coupon.

Periodically, or at the request of the master promotional controller, the promotional printer may transmit the saved coupon statistical data to the master promotional controller for analysis and other types of processing. The coupon tracking or statistical data may include details such as quantities of specific types of triggers received, quantities of each type of coupon issued, and the times and dates when triggers were received and coupons were issued.

In a promotional printer in accordance with an exemplary embodiment of the present invention, the promotional printer accepts promotional database loads and transfers statistical data with the master promotional controller either through a main communication port used for normally signaling pay out vouchers in the game, or through an auxiliary port allowing the promotional printer's promotional activities to be conducted in series or in parallel with the promotional printer's cash-out voucher printing functions within the cashless enabled gaming machine.

Figure 11:
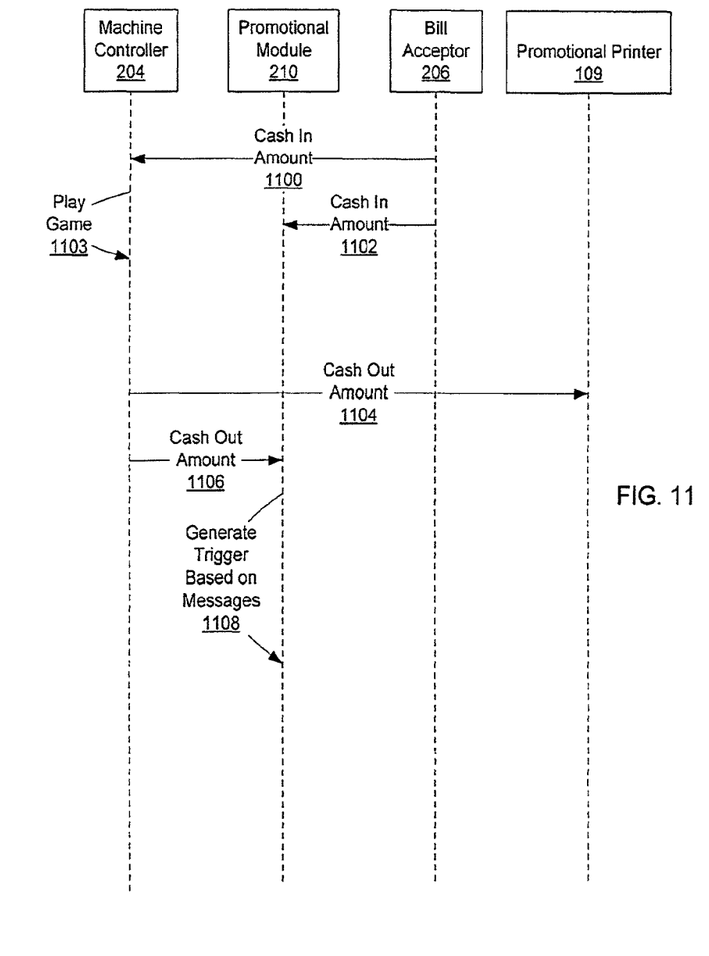
FIG. 11 is a sequence diagram of a promotional module using passive listening to generate coupon triggers.

FIG. 11 is a sequence diagram of a promotional module using passive listening to generate coupon triggers. In this embodiment, a promotional module 210, either as a standalone device or incorporated into promotional printer, listens in on communications between a machine controller 204 and a other devices, such as bill acceptor 206 and promotional printer 109. The promotional module listens in on the communications and generates coupon triggers based on various attributes of the messages, such as frequency of the messages, content of the messages, originator of the messages, receiver of the messages, etc. Once the trigger is generated, it is used as previously described by the gaming or vending machine to generate a coupon.

In a specific example of such a process, the bill acceptor receives a voucher, currency, or other value bearing token from a player and transmits a cash-in amount 1100 to the machine controller. The promotional module listens in on the communication between the bill acceptor and the machine controller and receives an identical cash in amount 1102 message or signal. In response to the cash-in amount, the machine controller allows the player to play (1103) the gaming machine. Eventually, the player will stop playing the game and request a cash-out. In response, the machine controller transmits a cash-out amount 1104 to the promotional printer. The promotional module receives a copy of the cash-out signal or message 1106. The promotional module may then generate (1108) a trigger based on the cash-in and cash-out messages that the promotional module listened in on but did not respond to.

Figure 8:
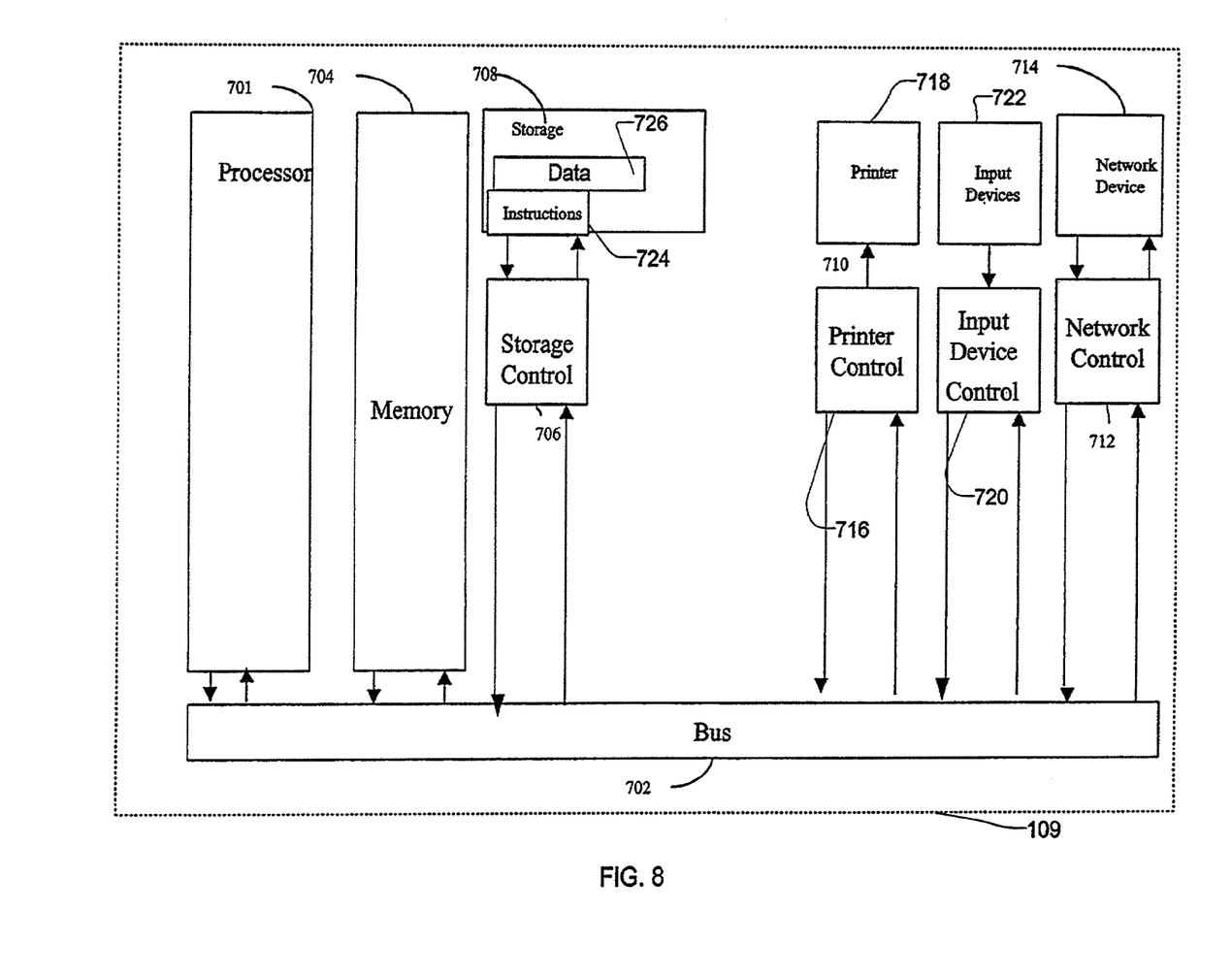
FIG. 8 is an architecture diagram of an exemplary promotional gaming printer in accordance with an exemplary embodiment of the present invention.

FIG. 8 is an architecture diagram of an exemplary promotional module or printer in accordance with an exemplary embodiment of the present invention. A promotional printer 109 includes a processor 701 operatively coupled via a system bus 702 to a main memory 704. The processor is also coupled to a storage device 708 via a storage controller 706 and the bus. The storage device includes stored program instructions 724 and data 726 such as coupon variable data, coupon templates, and coupon trigger control parameters. In operation, the program instructions implementing a promotional printer are stored on the storage device until the processor retrieves the program instructions and stores them in the main memory. The processor then executes the computer program instructions stored in the main memory and operates on the data stored in the storage device to implement the features of a promotional printer as described above.

The processor is further coupled to a printer mechanism 718 through a printer controller 702 via the bus. In operation, the processor executes the program instructions to generate printer mechanism control signals and transmits these signals to the printer mechanism via the bus and printer controller. In response to the printer mechanism control signals, the printer mechanism prints coupons for use by a player.

The processor is further coupled to external input devices 722 by an input device controller 720 via the bus. Example input devices include sensors that the promotional printer uses to detect proper printing of a coupon by the printer mechanism, coupon printer paper detectors, and real time clocks. The processor receives input device signals from the input devices via the input device controller and the bus and uses the input device signals to detect the state of the promotional printer's environment.

The processor is further coupled to a network device 714 via a network device controller 712 and the bus. The process uses the network device to communicate with other processing systems, such as a master promotional controller or a gaming or vending machine controller as previously described.

Figure 9:
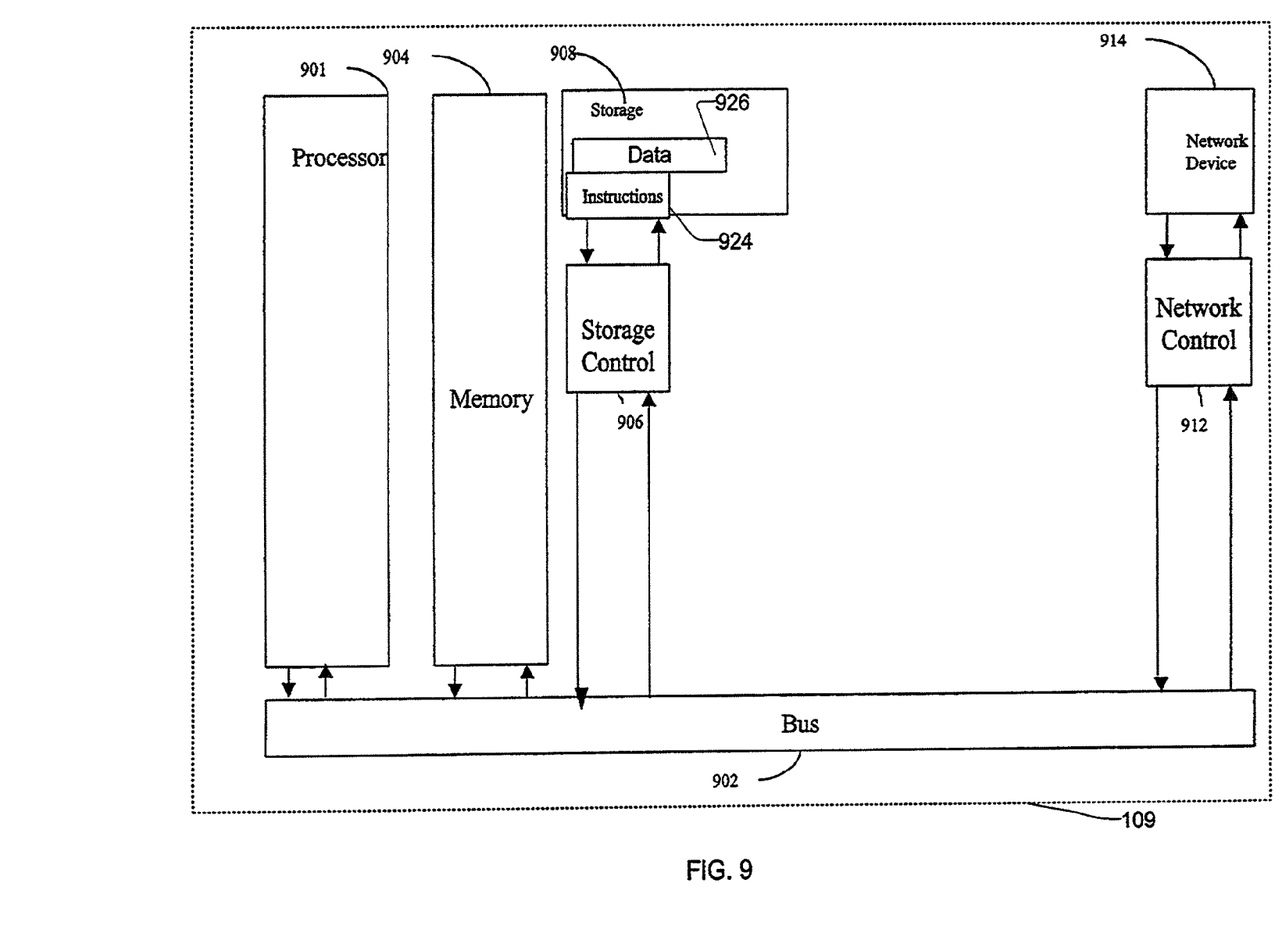
FIG. 9 is an architecture diagram of an exemplary master promotional controller in accordance with an exemplary embodiment of the present invention.

FIG. 9 is an architecture diagram of an exemplary master promotional controller in accordance with an exemplary embodiment of the present invention. A master promotional controller includes a processor 901 operatively coupled via a system bus 702 to a main memory 904. The processor is also coupled to a storage device 908 via a storage controller 906 and the bus. In operation, program instructions 924 implementing a master promotional controller are stored on the storage device until the processor retrieves the program instructions and stores them in the main memory. The processor then executes the computer program instructions stored in the main memory to implement the features of a master promotional controller as described above.

The processor is further coupled to a network device 914 via a network device controller 912 and the bus. The process uses the network device to communicate with other processing systems, such as a promotional printer or a gaming or vending machine controller as previously described.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supported by this application and the claims' equivalents rather than the foregoing description.

What is claimed is:

1. A method of printing a promotional coupon by a promotional module, comprising:
   receiving by the promotional module a first operational signal transmitted from a first device housed in the gaming machine, the first operational signal intended for a second device housed in the gaming machine, wherein the second device is not the promotional module;
   generating, by the promotional module using the first operational signal, promotional coupon printing information, the promotional coupon printing information for use by a gaming machine printer to print the promotional coupon; and
   transmitting by the promotional module to the gaming machine printer the promotional coupon printing information whereby the gaming machine printer prints the promotional coupon.

2. The method of claim 1, wherein:
   the first device is a bill validator;
   the second device is a gaming machine controller; and
   the first operational signal is a cash-in signal.

3. The method of claim 1, wherein:
   the first device is a gaming machine controller;
   the second device is the gaming machine printer; and
   the first operational signal is a cash-out signal.

4. The method of claim 1, further comprising receiving by the promotional module a second operational signal intended for a third device, wherein generation of the promotional coupon printing information further comprises using the second operational signal.

5. The method of claim 4, wherein:
   the first device is a gaming machine controller;
   the second device is a bill validator;
   the third device is the gaming machine printer;
   the first operational signal is a cash-in signal; and
   the second operational signal is a cash-out signal.

6. The method of claim 1, wherein the first operational signal is received by the promotional module from a signal tap coupled to the second device.

7. The method of claim 6, further comprising adding a device identifier to the first operational signal by the signal tap.

8. The method of claim 1, wherein the first operational signal is received by the promotional module from a communications network coupled to both the promotional module and the second device.

9. A promotional module comprising:
   a processor; and
   a memory coupled to the processor, the memory having program instructions executable by the processor stored therein, the program instructions comprising:
   receiving a first operational signal transmitted from a first device housed in the gaming machine, the first operational signal intended for a second device housed in the gaming machine, wherein the second device is not the promotional module;
   generating promotional coupon printing information using the first operational signal, the promotional coupon printing information for use by a gaming machine printer to print a promotional coupon; and
   transmitting to the gaming machine printer the promotional coupon printing information.

10. The promotional module of claim 9, wherein:
    the first device is a bill validator;
    the second device is a gaming machine controller; and
    the first operational signal is a cash-in signal.

11. The promotional module of claim 9, wherein:
    the first device is a gaming machine controller;
    the second device is the gaming machine printer printer; and
    the first operational signal is a cash-out signal.

12. The promotional module of claim 9, the program instructions further comprising:
    receiving a second operational signal intended for a third device; and
    using the second operational signal along with the first operational signal to generate the promotional coupon printing information.

13. The promotional module of claim 12, wherein:
    the first device is a gaming machine controller;
    the second device is a bill validator;
    the third device is the gaming machine printer;
    the first operational signal is a cash-in signal; and
    the second operational signal is a cash-out signal.

14. The promotional module of claim 9, wherein the first operational signal is received by the promotional module from a signal tap coupled to the second device.

15. The promotional module of claim 14, wherein the signal tap is further constructed to add a device identifier to the first operational signal.

16. The promotional module of claim 9 wherein the first operational signal is received from a communications network coupled to both the promotional module and the second device.

17. The method of claim 1, wherein generating by the promotional module the promotional coupon printing information further comprises using a trigger matrix to trigger the generation of the promotional coupon printing information based on the first operational signal.

18. The method of claim 17, further comprising receiving by the promotional module the trigger matrix from a promotional controller.

19. The promotional module of claim 9, wherein the instructions for generating the promotional coupon printing information further comprise using a trigger matrix to trigger the generation of the promotional coupon printing information based on the first operational signal.

20. The promotional module of claim 19, the program instructions further comprising receiving the trigger matrix from a promotional controller.

* * * * *